July 19, 1949.　　　　　J. E. MULHEIM　　　　　2,476,894
FLEXIBLE COUPLING

Filed Oct. 8, 1945　　　　　　　　　　　　　　　2 Sheets-Sheet 1

WITNESSES:

INVENTOR
Joseph E. Mulheim.
BY
ATTORNEY

July 19, 1949.　　　　J. E. MULHEIM　　　　2,476,894
FLEXIBLE COUPLING
Filed Oct. 8, 1945　　　　　　　　　　　　　2 Sheets-Sheet 2
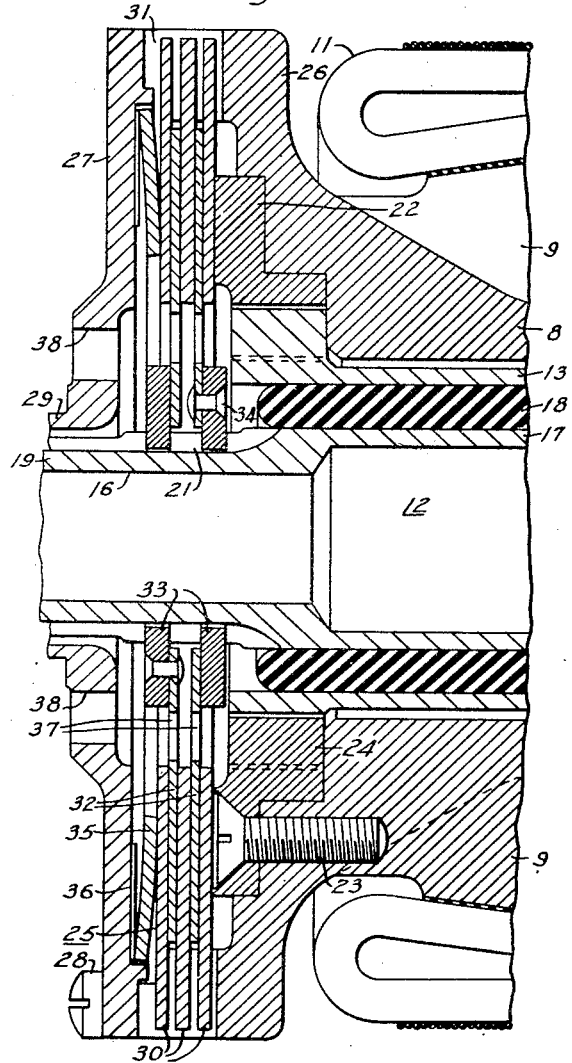
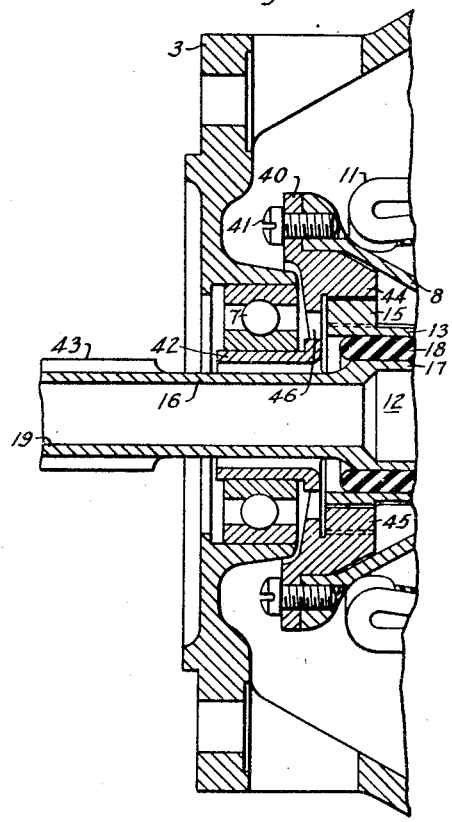
WITNESSES:
INVENTOR
Joseph E. Mulheim.
BY O. B. Buchanan
ATTORNEY Patented July 19, 1949

2,476,894

UNITED STATES PATENT OFFICE 2,476,894

FLEXIBLE COUPLING

Joseph E. Mulheim, Lima, Ohio, assignor to Westinghouse Electric Corporation, East Pittsburgh, Pa., a corporation of Pennsylvania Application October 8, 1945, Serial No. 621,083

4 Claims. (Cl. 74—574)

The present invention relates to coupling devices and, more particularly, to a flexible coupling for transmitting power to a driven shaft and for absorbing torsional vibration.

The coupling of the present invention is primarily intended for use with electric generators, or other devices, driven by an internal combustion engine, and it is especially adapted for driving aircraft generators, although its usefulness is obviously not restricted to this particular application.

Aircraft generators, which are used for supplying the electrical loads on airplanes, are usually mounted on a main engine of the airplane, and driven from a power take-off shaft geared to the engine crank-shaft. Thus, if the generator shaft were rigidly connected to the driving shaft, the generator would be subjected to severe torsional vibration caused by the pulsating torque of the internal combustion engine. This torsional vibration may have a considerable amplitude over a relatively wide range of frequencies, and it will be apparent that if this vibration were transmitted to the generator through a rigid driving connection, excessive torsional stresses would be set up in the generator. For this reason, it is necessary to provide a flexible coupling device for connecting the generator shaft to the drive shaft in order to absorb the torsional vibration, or at least to materially reduce the amplitude of the vibration transmitted to the generator, so as to keep the stresses in the generator within permissible limits. It is desirable for such a coupling device to have relatively high flexibility in order to keep the natural frequency of the coupling below the range of frequencies of torsional vibration which occur in the normal operating speed range of the engine, so as to avoid resonance, which would amplify the vibration. By making the coupling sufficiently flexible, resonance can be avoided except as a transient condition during starting and stopping of the engine, and the generator is substantially isolated from the engine vibration during normal operation. If adequate damping is provided, the amplitude of vibration during the transient resonant condition can be kept from becoming excessively large.

Thus, a flexible coupling for use with aircraft generators must have relatively high flexibility, so as to have a low natural frequency and adequately protect the generator from torsional vibration. There are also certain other requirements which must be met by a coupling intended for this service. Such a coupling must permit the existence of a reasonable amount of angular or lateral misalignment between the generator shaft and the drive shaft without causing rapid wear or excessive loading of any part of the coupling, since it is not always practicable, in mounting a generator on an aircraft engine, to obtain absolutely perfect alignment of the generator shaft and the engine drive shaft. The coupling must also be capable of interrupting the drive under a predetermined excess torque, in order to protect the driving gears in case the generator shaft should jam as a result of mechanical failure. In common with other types of aircraft equipment, a flexible coupling for aircraft use must be highly reliable, and its weight must be as low as possible. It will be obvious, therefore, that the design of a flexible coupling to meet these exacting requirements presents a difficult problem.

The principal object of the present invention is to provide a flexible coupling device for transmitting power to a driven shaft and for absorbing torsional vibration, which meets all of the requirements outlined above, and which is of simple and reliable construction.

A further object of the invention is to provide a flexible coupling device for transmitting power to a driven shaft, which can readily be designed to have high flexibility, so as to have a low natural frequency, and which will permit a reasonable amount of misalignment between the driving means and the driven shaft without causing excessive wear of any part of the coupling.

Another object of the invention is to provide a flexible coupling device which will slip to interrupt the drive at a predetermined excess torque, and in which the slip point and the deflection characteristics of the coupling can be accurately controlled.

Still another object of the invention is to provide a flexible coupling device for transmitting power to a driven shaft, with a friction damping means to reduce the amplitude of torsional vibration, the assembly being designed so that all parts, including a bearing for the shaft, are adequately ventilated.

The invention will be more fully understood from the folowing detailed description, taken in connection with the accompanying drawings, in which:

Fig. 3 is a fragmentary setcional view, on an enlarged scale, showing a damping means; and Fig. 4 is a fragmentary sectional view showing a modified embodiment of the invention.

Figure 1:
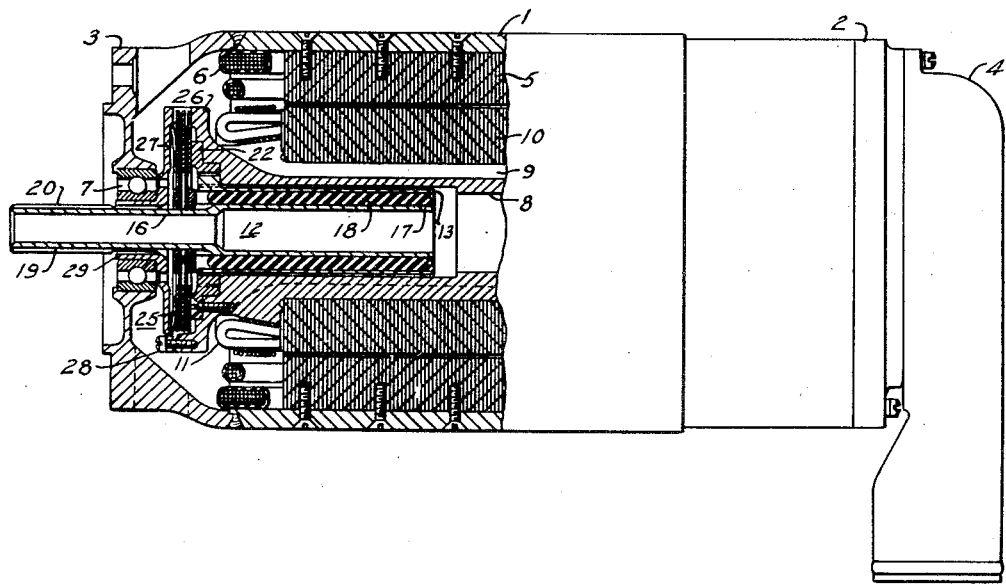
Figure 1 is a view, partly in side elevation and partly in longitudinal section, showing the application of the coupling of the present invention to an aircraft generator.

The coupling device of the present invention is shown in Fig. 1 as applied to a direct-current aircraft generator. The particular generator shown in the drawings for the purpose of illustration has a frame member 1, which is closed at one end by an end bracket 2 and at the opposite end by an end bracket 3 which is adapted to be mounted on an aircraft engine. An air shield or hood 4 is preferably secured to the end bracket 2, and is adapted for connection to a blast tube, or other source of ventilating air, to provide blast cooling of the generator in the usual manner. Pole pieces 5 are mounted in the frame 1 of the generator and carry suitable field windings 6. The rotor or armature member of the generator is supported in ball bearings 7 mounted in the end brackets 2 and 3, and includes a hollow shaft 8 which has a plurality of generally radial ribs 9. A laminated armature core 10 is supported on the ribs 9 and carries suitable armature windings 11.

Figure 2:
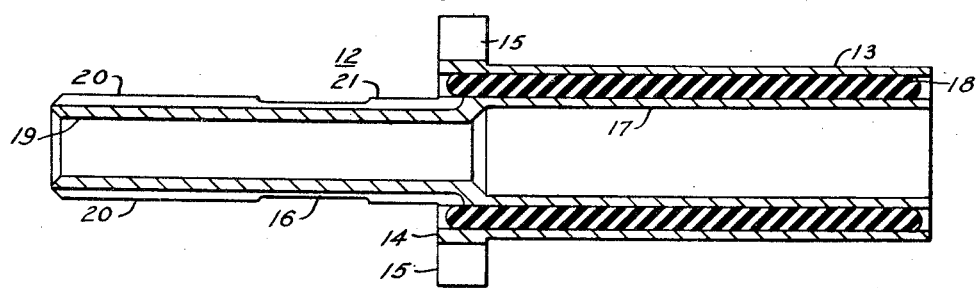
Fig. 2 is a longitudinal sectional view of the coupling device.

The armature shaft 8 is driven by the flexible coupling device 12 to which the present invention is particularly directed. As more clearly shown in Fig. 2, the coupling 12 includes a tubular member 13 of steel, or other suitable rigid material, with a radial flange portion 14 at one end having teeth 15 to effect a driving connection with the shaft to be driven by the coupling. The coupling 12 also includes a driving member 16, which is also shown as being a tubular member in order to keep the weight as small as possible, although it will be apparent that a solid member could be used. The driving member 16 of the coupling has a cylindrical portion 17, which has an outside diameter somewhat less than the inside diameter of the tubular member 13, and which is disposed within the member 13.

A flexible driving connection between the members 13 and 16 is effected by means of a tubular member, or sleeve, 18 of a suitable resilient material, preferably rubber, either natural or synthetic. The rubber tubular member 18 is proportioned to fit tightly in the annular space between the tubular member 13 and the portion 17 of the driving member 16, but is not bonded or otherwise connected to them, so that the driving connection is effected solely by the frictional engagement between the resilient material 18 and the members 13 and 17. The portion 19 of the driving member 16 which extends out of the tubular member 13 is provided with spline teeth 20 at its outer end for engagement with the driving means and, in the preferred embodiment, the teeth 20 extend for the entire length of the portion 19 of the driving member 16 and have portions 21 adjacent the cylindrical portion 17 for engagement with the damping means described hereinafter.

This coupling device has several distinct advantages. By properly proportioning the resilient tubular member 18, and by correct choice of material, the deflection characteristics of the coupling can be very accurately controlled, so as to make the flexibility as great as desired, and in this way the resonant frequency, or natural frequency, can be made to have substantially any desired value. Since the rubber member 18 is not bonded to the other elements of the coupling, but drives them only by frictional engagement, the rubber member 18 will slip with respect to the tubular members 13 and 16 at a deflection of the coupling corresponding to a predetermined excess torque, so that the coupling interrupts the drive to protect the drive gears in case of jamming of the generator armature because of mechanical failure, or for any other reason. The slip point, or the excess torque at which slipping occurs, can be controlled very accurately in the design of the coupling, and thus the drive gears are positively protected.

When the amplitude of deflection of the rubber member 18 of the coupling becomes great enough for slipping to occur, the amplitude of deflection remains constant, and thus the maximum deflection of the rubber member and, therefore, the maximum shearing stress in the rubber, are limited by the slip torque for which the coupling is designed. The heat generated during slippage of the coupling changes the deflection characteristics of the rubber, and thus changes the natural frequency, so that the coupling is able to withstand operation at its critical frequency for long periods of time without damage, and without causing excessive amplitudes of torsional vibration to be transmitted. It will also be obvious that the weight of this coupling device is relatively small, and that because of its simplicity, it is very reliable and can readily be produced.

In applying the coupling 12 to an aircraft generator, as shown in Figs. 1 and 3, the coupling is partly disposed within the hollow shaft 8, and the outside diameter of the tubular member 13 of the coupling is made somewhat less than the inside diameter of the hollow shaft 8, so that the coupling fits into the shaft with a small annular clearance between the coupling and the shaft. The shaft 8 is driven by means of an annular member 22 secured to the end of the shaft in any suitable manner, as by screws 23. The member 22 has teeth 24 cut in its internal periphery to engage with the teeth 15 of the tubular member 13 of the coupling 12. The teeth 15 and 24 are designed to have substantial clearance between them, as shown in Fig. 3, to effect a loose, splined driving connection, so that a reasonable amount of misalignment, either angular or lateral, can occur between the generator shaft 8 and the coupling 12 without causing excessive wear on the teeth, or excessive loading of any part of the coupling. Thus, the generator shaft 8 is driven from the driving means (not shown), which engages the splines 20 of the coupling 12, through the resilient coupling and the engaging teeth 15 and 24 of the coupling and the shaft, respectively.

In the preferred embodiment of the invention shown in Figs. 1 and 3, a frictional damping means, generally designated by 25, is provided to damp the torsional vibration which may be transmitted through the coupling to the generator shaft in order to decrease the amplitude of such vibration, especially during transient resonance conditions when undesirably large amplitudes of vibration may occur, with resultant high stresses in the generator. In order to accommodate the damping means 25, the shaft 8 terminates in a radial flange portion 26 of relatively large diameter. An annular cap member 27 is attached to the outer surface of the flange portion 26 by means of screws 28, and the cap member 27 has an axially extending flange portion 29 which engages the bearing 7 to support the shaft at that end of the generator.

The damping means 25 is positioned in a recess in the end of the shaft 8 between the flange portion 26 of the shaft and the cap member 27. The damping means 25 includes a plurality of friction plates 30, which are preferably made of, or faced with, sintered material or other suitable friction material. The plates 30 are of annular shape and have radial projections about their outer periphery which engage in slots 31 cut in the outer wall of the recess in which the damper is positioned within the flange portion 26 of the shaft, so that the plates 30 move with the shaft 8. The damping means 25 also includes a plurality of steel plates 32 alternating with the friction plates 30. The plates 32 are also annular in shape, although of smaller diameter than the plates 30, and are mounted on hub members 33 by means of rivets 34, or in any other suitable manner. The hub members 33 are internally splined to engage the spline teeth 21 of the driving member 16 of the coupling 12, which extends through the axial flange 29 of the cap member 27, the spline teeth being reduced in diameter between the portions 20 and 21 to prevent interference with the flange. Thus, the plates 32 move with the driving member 16 of the coupling.

The alternating plates 30 and 32 are forced into frictional engagement with each other by means of a spring washer 35, which is held in position against the plates by the cap member 27, the spring pressure being adjusted to the desired value by a shim or shims 36. Thus, the outer set of plates 30, which move with the shaft 8, is held in frictional engagement with the inner set of plates 32, which move with the drive member 16 of the coupling, so that relative torsional movement between the shaft and the drive member is damped by the frictional engagement of the damping plates, and thus the amplitude of torsional vibration of the shaft is reduced.

The construction of the present invention also provides for adequate ventilation of the bearing 7 at the coupling end of the generator in the manner described and claimed in a copending application of J. D. Miner, Jr. and J. E. Mulheim, Serial No. 526,012, filed March 11, 1944, now Patent No. 2,436,320, issued February 17, 1948. As more fully set forth in that application, it is difficult to adequately cool the bearings at the rear or coupling ends of aircraft generators, and it is proposed in the copending application to provide sufficient cooling for these bearings by conducting cooling air to them through a hollow shaft, and directing it from the shaft to flow directly over the rear bearing.

The construction of the present invention is adapted to provide ventilation for the bearing 7 in this manner. The tubular member 13 of the coupling 12 fits into the shaft 8 with an annular clearance between the coupling and the shaft, as previously described, so that air flowing through the hollow shaft 8 from the air hood 4 flows through the annular space between the coupling and the shaft. The cooperating teeth 15 and 24 of the coupling and shaft, respectively, have sufficient clearance to permit misalignment of the shaft and coupling, as previously explained, and this clearance is also sufficient to permit the air flowing between the shaft and coupling to flow between the cooperating teeth. Holes 37 are provided in the damper plates 32 in the path of this air, and corresponding holes 38 are formed in the annular cap member 27, so that the air flowing through the hollow shaft 8 flows between the shaft and the coupling member, through the engaging teeth 15 and 24 and through the holes 37 and 38 directly to the bearing 7, so that the bearing is adequately cooled in the manner described in the above-mentioned application.

In some cases, the damping means 25 described above in connection with the preferred embodiment of the invention may be omitted, and a construction such as that shown in Fig. 4 used, in which no damping other than the damping inherent in the coupling 12 itself is provided. In this construction, the hollow armature shaft 8 terminates in a radial surface to which an annular cap member 40 is attached by screws 41, or in any other suitable manner. The cap member 40 has an axial flange portion 42 which engages the bearing 7 to support the shaft, the driving member 16 of the flexible coupling 12 passing through the flange 42. In this embodiment of the invention, the portion 19 of the driving member 16 may have spline teeth 43 at its outer end only, for engagement with the driving means, the coupling 12 being otherwise exactly the same as previously described.

The annular cap member 40 has an axially extending portion 44, extending over the end of the tubular member 13 of the coupling, and this portion 44 of the cap member 40 has internal teeth 45 cut in it for engagement with the teeth 15 of the coupling to effect a driving connection between the coupling 12 and the shaft 8. The teeth 15 and 45 are designed to have sufficient clearance to permit misalignment between the shaft and the coupling, as previously described, and to permit ventilating air flowing through the shaft to flow between the teeth. The annular cap member 40 has holes 46 opposite the engaging teeth 15 and 45, through which the cooling air flows directly over the bearing 7 to cool it. It will be apparent that, except for the omission of the damping means 25, the embodiment of the invention shown in Fig. 4 is similar to that of Figs. 1 and 3, and has the same advantages.

It should now be apparent that a flexible coupling device has been provided which has many advantages, especially in its application to aircraft generators, although the same advantages can obviously be attained in connection with other types of equipment, since the coupling device 12 itself is capable of use with various types of equipment, and may be used in any suitable assembly to transmit power to a driven shaft. When used for its primary purpose of driving an aircraft generator, however, the particular structure and arrangement shown and described have been found to be very advantageous in combination with this type of flexible coupling.

It will be obvious, that the invention is capable of various modifications and embodiments, and is not restricted to the particular arrangement shown and described. It is to be understood, therefore, that the invention is not limited to the particular structural details illustrated, but in its broadest aspects it includes all equivalent embodiments and modifications which come within the scope of the appended claims.

I claim as my invention:

1. In combination, a hollow driven shaft, a tubular member disposed within said driven shaft and having a driving connection therewith, a rigid driving member having a cylindrical portion disposed within said tubular member, a tubular member of resilient material fitting tightly in the annular space between the driving member and the first-mentioned tubular member to effect a resilient driving connection therebetween, and friction damping means engaging said driving member and said driven shaft to damp torsional vibration.

2. In combination, a hollow driven shaft, a tubular member disposed within said driven shaft, said tubular member and driven shaft having cooperating teeth thereon to effect a driving connection, said cooperating teeth having sufficient clearance to permit a small amount of misalignment between the tubular member and the driven shaft, a rigid driving member having a cylindrical portion disposed within said tubular member, a tubular member of resilient material fitting tightly in the annular space between the driving member and the first-mentioned tubular member to effect a resilient driving connection therebetween, and friction damping means engaging said driving member and said driven shaft to damp torsional vibration.

3. In combination, a hollow driven shaft, a tubular member disposed within said shaft, said tubular member being of smaller diameter than the hollow of the shaft so as to provide a space between the tubular member and the shaft, said shaft having teeth adjacent the end thereof and said tubular member having teeth cooperating with the teeth of the shaft to effect a driving connection, said cooperating teeth having sufficient clearance therebetween to permit a small amount of misalignment between the tubular member and the shaft and to permit air flowing through the hollow shaft and the space between the tubular member and the shaft to flow between the cooperating teeth, a driving member having a cylindrical portion disposed within said tubular member, a tubular member of resilient material fitting tightly in the annular space between the driving member and the first-mentioned tubular member, an annular cap member secured to the end of said hollow driven shaft, said cap member having a tubular flange portion and said driving member passing through the cap member, and a bearing for the driven shaft engaging the flange portion of the cap member, said bearing being disposed in the path of air flowing between said cooperating teeth to be cooled thereby.

4. In combination, a hollow driven shaft, a tubular member disposed within said shaft, said tubular member being of smaller diameter than the hollow of the shaft so as to provide a space between the tubular member and the shaft, said shaft having teeth adjacent the end thereof and said tubular member having teeth cooperating with the teeth of the shaft to effect a driving connection, said cooperating teeth having sufficient clearance therebetween to permit a small amount of misalignment between the tubular member and the shaft and to permit air flowing through the hollow shaft and the space between the tubular member and the shaft to flow between the cooperating teeth, a driving member having a cylindrical portion disposed within said tubular member, a tubular member of resilient material fitting tightly in the annular space between the driving member and the first-mentioned tubular member, an annular cap member secured to the end of said hollow driven shaft, said cap member having a tubular flange portion and said driving member passing through the cap member, a bearing for the driven shaft engaging the flange portion of the cap member, and friction damping means engaging the driving member and the driven shaft to damp torsional vibration, said damping means comprising interengaging plates secured to the driving member and the driven shaft respectively and means for forcing the plates into frictional engagement, said plates and said cap member having openings therein, whereby air flowing between said cooperating teeth flows over the bearing to cool it.

JOSEPH E. MULHEIM.

REFERENCES CITED

The following references are of record in the file of this patent:

UNITED STATES PATENTS

| Number | Name | Date |
|---|---|---|
| 1,941,061 | Thiry | Dec. 26, 1933 |
| 2,025,834 | Tautz | Dec. 31, 1935 |
| 2,114,807 | McCavitt | Apr. 19, 1938 |
| 2,174,223 | Frauenthal et al. | Sept. 26, 1939 |
| 2,220,751 | Bergman | Nov. 5, 1940 |
| 2,361,226 | Miner, Jr., et al. | Oct. 24, 1944 |

FOREIGN PATENTS

| Number | Country | Date |
|---|---|---|
| 302,625 | Great Britain | Sept. 15, 1927 |

OTHER REFERENCES

Scientific American, page 272, May 1941.